US010645536B1

(12) United States Patent
Barnes et al.

(10) Patent No.: US 10,645,536 B1
(45) Date of Patent: May 5, 2020

(54) OBJECT LOCATION AND TRACKING

(71) Applicant: Royal Caribbean Cruises Ltd., Miami, FL (US)

(72) Inventors: Laura Barnes, Miami, FL (US); Joey Hasty, Miami, FL (US)

(73) Assignee: ROYAL CARIBBEAN CRUISES LTD., Miami, FL (US)

( * ) Notice: Subject to any disclaimer, the term of this patent is extended or adjusted under 35 U.S.C. 154(b) by 0 days.

(21) Appl. No.: 16/425,901

(22) Filed: May 29, 2019

(51) Int. Cl.
*H04Q 5/22* (2006.01)
*H04W 4/029* (2018.01)
*H04W 4/021* (2018.01)
*H04W 4/80* (2018.01)

(52) U.S. Cl.
CPC .......... *H04W 4/029* (2018.02); *H04W 4/021* (2013.01); *H04W 4/80* (2018.02)

(58) Field of Classification Search
CPC .......... H04B 1/48; H04W 4/02; H04W 4/12; H04W 4/18; H04W 4/023; H04W 4/029; H04W 4/80; H04W 4/021; G06K 7/10475; G06F 16/29; G01S 5/0252; G01S 5/04; G01S 5/14
See application file for complete search history.

(56) References Cited

U.S. PATENT DOCUMENTS

| | | | | |
|---|---|---|---|---|
| 5,767,804 A | * | 6/1998 | Murphy | G01S 5/0036 342/357.31 |
| 9,374,667 B1 | * | 6/2016 | Jorgensen | H04W 4/021 |
| 9,648,452 B1 | * | 5/2017 | Cronin | H04W 4/18 |
| 10,410,027 B1 | * | 9/2019 | Song | G06K 7/10475 |
| 2006/0139167 A1 | * | 6/2006 | Davie | G01S 13/878 340/539.13 |
| 2006/0238610 A1 | * | 10/2006 | Teesdale | G07C 9/28 348/14.02 |
| 2007/0013519 A1 | * | 1/2007 | Chung | G06Q 10/08 340/572.1 |
| 2007/0268138 A1 | * | 11/2007 | Chung | G01S 5/0018 340/572.1 |
| 2009/0273450 A1 | * | 11/2009 | Moran | G06K 19/07336 340/10.4 |

(Continued)

*Primary Examiner* — An T Nguyen
(74) *Attorney, Agent, or Firm* — Steven M. Greenberg, Esq.; Shutts & Bowen LLP

(57) ABSTRACT

Embodiments of the invention provide a method, system and computer program product for object location and tracking. A method for object location and tracking within a bounded space includes establishing a wireless communications link between a wireless network adapter disposed within a smartphone and a wireless access point positioned remotely from the smartphone, and receiving thereafter, an identity of the wireless access point. Thereafter, a short-range wireless signal is received in the smartphone by a short-range wireless receiver disposed within the smartphone separately from the wireless network adapter, and an identifier of an object is extracted therefrom. Finally, a message is generated that combines the identity of the wireless access point and the identifier of the object and the message is transmitted through the wireless communications link to a host server coupled both to the wireless access point and also several other wireless access points over a computer communications network.

17 Claims, 2 Drawing Sheets

(56) References Cited

U.S. PATENT DOCUMENTS

| | | | | |
|---|---|---|---|---|
| 2010/0201520 A1* | 8/2010 | Stern | ............ | G01S 13/75 340/572.1 |
| 2011/0163916 A1* | 7/2011 | Bamidele | ............ | G01S 5/14 342/451 |
| 2014/0206347 A1* | 7/2014 | Shah | ............ | G08B 21/24 455/426.1 |
| 2015/0169916 A1* | 6/2015 | Hill | ............ | G08B 13/2462 340/10.1 |
| 2015/0347959 A1* | 12/2015 | Skaaksrud | ............ | G06Q 10/0833 705/333 |
| 2016/0238692 A1* | 8/2016 | Hill | ............ | G02B 27/017 |
| 2016/0337796 A1* | 11/2016 | Pandharipande | ............ | H04W 12/02 |
| 2017/0234962 A1* | 8/2017 | Yang | ............ | G01S 5/0252 342/465 |
| 2018/0146333 A1* | 5/2018 | Lien | ............ | H04B 1/48 |
| 2018/0183650 A1* | 6/2018 | Zhang | ............ | G01S 13/00 |
| 2018/0219869 A1* | 8/2018 | Kumar | ............ | H04W 12/12 |
| 2019/0174255 A1* | 6/2019 | Anders | ............ | H04L 67/18 |

\* cited by examiner

OBJECT LOCATION AND TRACKING

BACKGROUND OF THE INVENTION

Field of the Invention

The present invention relates to the field of object location and tracking and more particularly to object location and tracking within a bounded space.

Description of the Related Art

Object location and tracking refers to the location and tracking of an object in two or three-dimensional space. While object location and tracking technologies have existed for many decades, consumer access to object location and tracking technologies did not be widespread until the commercialization of global positioning system (GPS) technologies and the ubiquity of mobile data communications. Combining both technologies, an object is able to locate its current position through processing of GPS signals and reporting the located position to a remote observer by way of mobile data communications. This potent combination has proven effective in the tracking not only of large vehicles, but also individuals including adults and children, and also small and large animals alike. Yet, it is well understood that the foregoing is limited to the circumstance where clear access to a satellite broadcasted signal exists.

Within a bounded space in which no clear access GPS satellites exists, a different ubiquitous technology presents an alternative to GPS dependent object tracking and location. Radio frequency identification (RFID) coupled with one or more RFID readers of known location with the combined space permits one to know the contemporaneous location of an RFID tag affixed to an object of interest within a bounded space. As an object with RFID tag moves within the bounded space, the periodic reading of the RFID tag by different RFID readers at different locations allows for the extrapolation of a rough course of movement within the bounded space. RFID technologies thus have found widespread application in connection with inventory control in a warehouse, the movement of luggage in an airport and between airports, and even in the context of child location and tracking within a bounded space such as a school or amusement park.

More recent advancements in short range wireless communications have expanded the basic paradigm of RFID object location and tracking. In this regard, on the presumption that individuals of interest typically carry a smart phone, a Bluetooth transmitter transmits an identifier which may be captured by a proximate Bluetooth receiver of known location. In this way, just as it were true with RFID, a Bluetooth object location and tracking system can leverage the known location of fixed Bluetooth readers to extrapolate a course of travel of an individual with a smart phone within a bounded space. Of course, no matter the underlying technology, all such technologies require the installation of fixed readers in communication with a centralized controller—a costly proposition.

BRIEF SUMMARY OF THE INVENTION

Embodiments of the present invention address deficiencies of the art in respect to the location of a person within a bounded space and provide a novel and non-obvious method, system and computer program product for object location and tracking. In an embodiment of the invention, a method for object location and tracking within a bounded space includes establishing a wireless communications link between a wireless network adapter disposed within a smartphone and a wireless access point positioned remotely from the smartphone, and receiving thereafter, an identity of the wireless access point. Thereafter, a short-range wireless signal is received in the smartphone by a short-range wireless receiver disposed within the smartphone separately from the wireless network adapter, and an identifier of an object is extracted therefrom. Finally, a message is generated that combines the identity of the wireless access point and the identifier of the object and the message is transmitted through the wireless communications link to a host server coupled both to the wireless access point and also several other wireless access points over a computer communications network.

In one aspect of the embodiment, the short-range wireless receiver is a Bluetooth receiver. In another aspect of the embodiment, the object is a wristband that includes non-volatile storage storing the identifier and a Bluetooth transmitter adapted to periodically transmit the identifier. Alternatively, the object is a wristband that includes non-volatile storage storing the identifier and a Bluetooth transceiver adapted to receive a Bluetooth signal requesting the identifier from the smartphone, and to respond to the received Bluetooth signal by transmitting a Bluetooth signal with the identifier to the smartphone.

In another embodiment of the invention, a data processing system is configured for object location and tracking within a bounded space, such as a cruise ship, hotel, stadium, office building or airport, to name a few examples. The system includes a host server including one or more computers, each with memory and at least one processor, and a network adapter communicatively coupled to a multiplicity of different wireless access points fixed to different locations in a bounded space. The system also includes a multiplicity of objects, each including a short-range wireless transmitter and non-volatile memory storing therein a unique identifier. The system yet further includes a multiplicity of executing instances of an object location and tracking client module. Finally, the system includes an instance of an object location and tracking server module.

The client module includes computer program instructions adapted upon execution in memory of a client computing device to receive a short-range wireless signal from one of the objects, to extract from the signal an identifier of the object, to retrieve an identity of one of the wireless access points to which the client computing device is wirelessly coupled, to generate a message combining the identifier of the object with the identity of the one of the wireless access points, and to transmit to the host server by way of the one of the wireless access points. Complimentarily, the server module includes computer program instructions adapted upon execution in the memory of the host server to receive messages from ones of the executing instances of the object location and tracking client module, and for each message, to correlate the received message with one of the objects, to determine an associated one of the wireless access points for the one of the objects, and to write a record in the memory of the server of specifying the one of the objects and a location of the associated one of the wireless access points.

In one aspect of the embodiment, the computer program instructions of the server module are further adapted to associate a time stamp with each of the received messages and, for each of the objects correlated to the messages, computing a course of movement within the bounded space.

In another aspect of the embodiment, the computer program instructions of the server module are further adapted to query a database of individuals with the identifier of the object for each of the message so as to associate each of the objects of the received messages with a specific individual. In event yet another aspect of the embodiment, the computer program instructions of the server module are yet further adapted to select a target one of the individuals, to determine a location of the target one of the individuals and also nearby one of the individuals also associated with the location based upon both of the nearby one of the individuals being communicatively coupled to a same one of the wireless access points identified for the target one of the individuals, and to transmit text to the nearby one of the individuals specifying the target one of the individuals.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for object location and tracking within a bounded space. In accordance with an embodiment of the invention, a short-range wireless communications signal is received into memory of a smartphone in connection with a wearable and an identifier is retrieved from the signal. Thereafter, an identity of a wireless access point providing network access to the smartphone is retrieved from memory of the smartphone as stored in a wireless network interface configuration within the memory of the smartphone. Finally, a message is transmitted by the smartphone to a remote host over the network including at least the identifier of the wearable and the identity of the wireless access point. Consequently, as the host receives multiple different messages from multiple different smartphones in reference to the identifier of the wearable, a course of movement of the wearable can be determined in reference to the known location of each access point implicated by the messages and the times during the messages were transmitted or received without requiring the deployment of costly RFID or Bluetooth readers at fixed locations within the bounded space.

Figure 1:
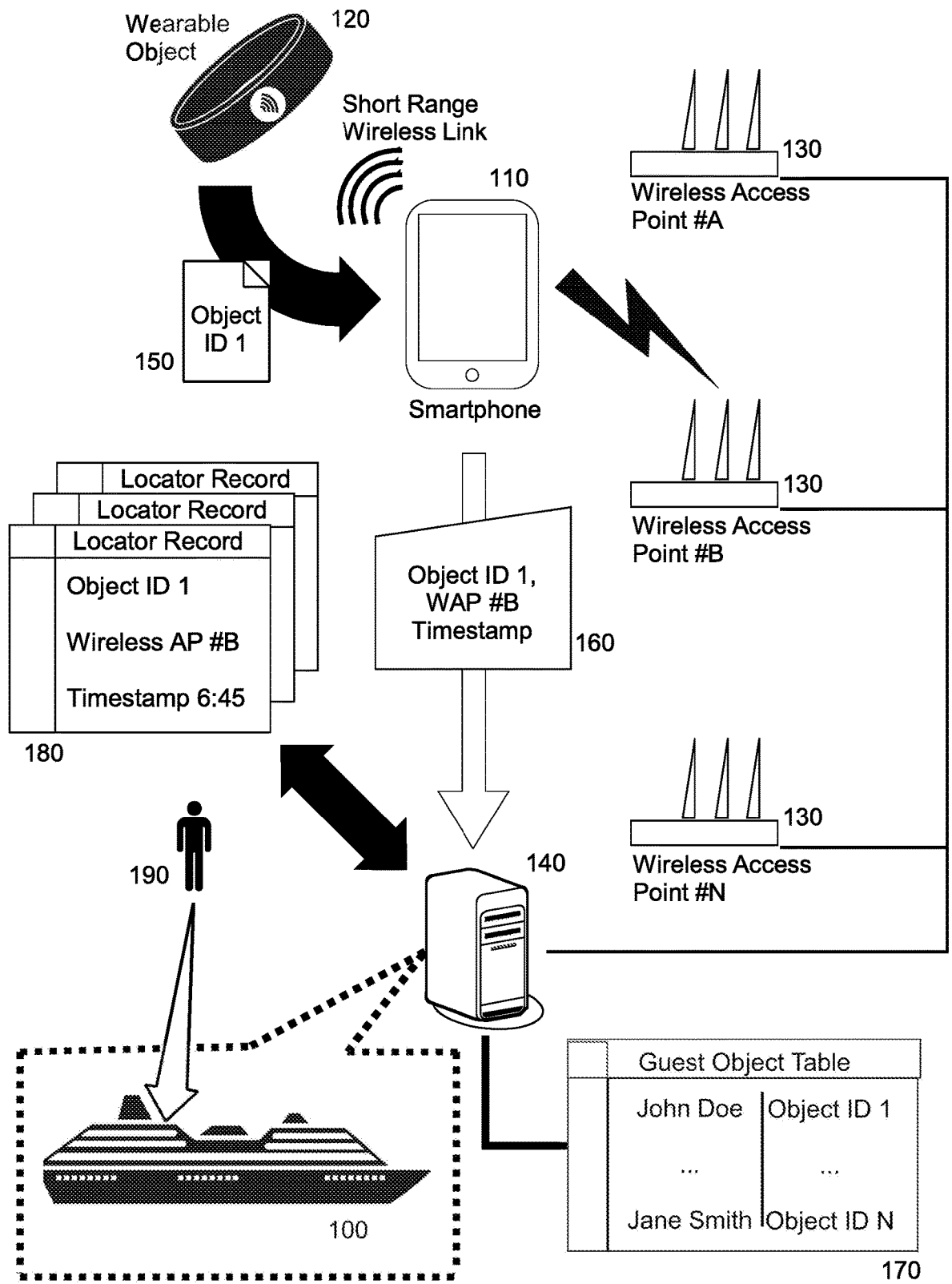
FIG. 1 is pictorial illustration of a process for object location and tracking within a bounded space.

In further illustration, FIG. 1 pictorially shows a process for object location and tracking within a bounded space. As shown in FIG. 1, a smartphone 110 establishes a wireless communicative link with one of a multiplicity of different wireless access points 130 positioned in fixed locations about a bounded space such as a hotel, stadium, office building or cruise ship. As the smartphone 110 moves about the bounded space, the smartphone 110 re-establishes different wireless communicative links with others of the wireless access points 130, generally selecting at any given point in time, one of the wireless access points 130 providing a strongest wireless signal registrable in the smartphone 110.

Of note, the smartphone 110 receives a signal 150 over a short-range wireless communicative link from a short-range wireless transmitter disposed on a wearable object 120 such as a wristband or pendant. The signal includes an object identifier uniquely identifying the wearable object 120. As such, the smartphone 110 extracts the object identifier from the signal 150. The smartphone 110 then retrieves an identifier of the one of the wireless access points 130 to which the smartphone 110 then is contemporaneously coupled. The smartphone 110 combines the object identifier of the signal 150 with the identifier of the one of the wireless access points 130 and generates a message 160. Once the smartphone 110 generates the message 160, the smartphone transmits the message 160 to server 140 over the wireless communications network by way of the one of the wireless access points 130 to which the smartphone 110 then is contemporaneously coupled.

Upon receipt of the message 160, the server 140 extracts from the message 160, both the object identifier and also the identity of the one of the wireless access points 130 to which the smartphone 110 then is contemporaneously coupled. The server 140 then locates by way of an object-to-individual table 170, an association between the object identifier and an individual present within the bounded space. As well, the server 140 correlates the one of the wireless access points 130 to which the smartphone then is contemporaneously coupled, with a specific location in the bounded space in which the one of the wireless access points 130 is fixed and to which the smartphone 110 then is contemporaneously coupled.

Thereafter, the server 140 writes a location record 180 including the object identifier, the one of the wireless access points 130 to which the smartphone 110 then is contemporaneously coupled and a timestamp associated with when the message had either been transmitted by the smartphone 110 or received in the server 140. In consequence, it will be recognized that a series of the locator records 180 when filtered for a specific object identifier and sorted by timestamp, indicates a movement over time of the wearable object 120 about the bounded space to the extent that each of the wireless access points 130 is associated with a fixed location in the bounded space. Optionally, the server 140 is able to generate a display 100 of the bounded space with an indication of a location in the bounded space of the individual associated with the wearable object 120 and the server 140 is able also to show a graphical movement in the display 100 of the individual in the bounded space over time.

Figure 2:
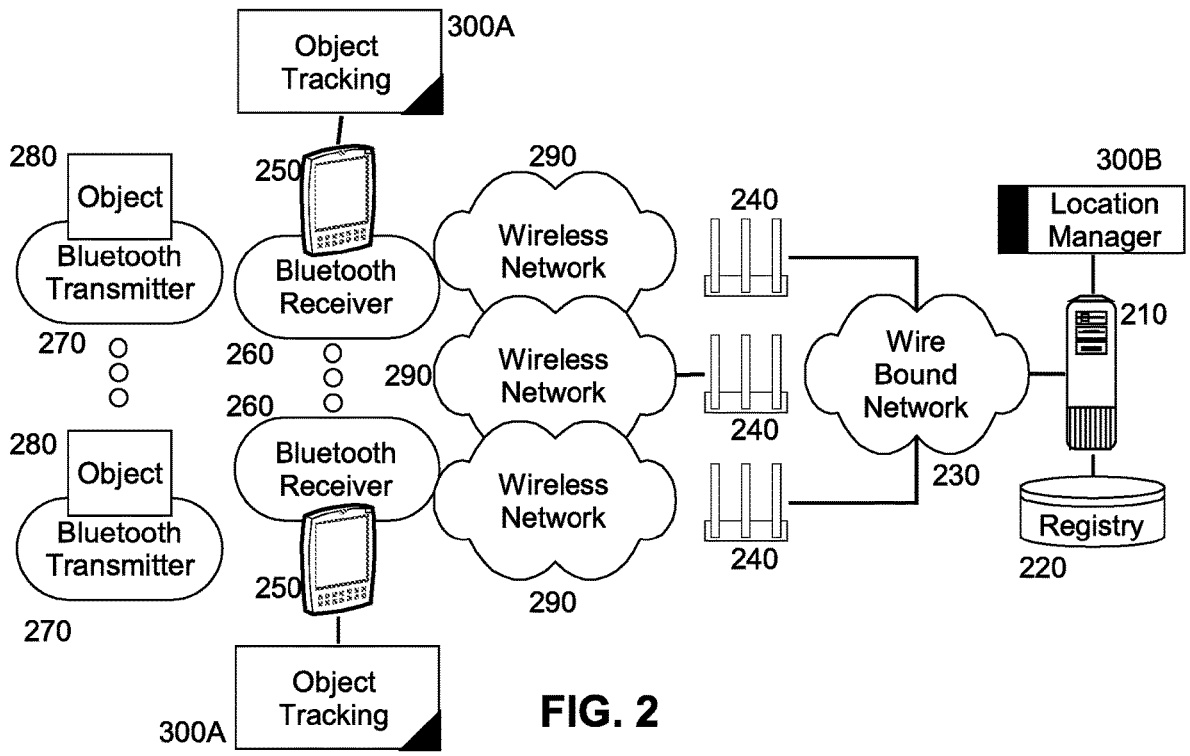
FIG. 2 is a schematic illustration of a mobile computing device adapted for object location and tracking within a bounded space; and, FIG. 3 is a flow chart illustrating a process for object location and tracking within a bounded space.

The process described in connection with FIG. 1 can be implemented within a data processing system. In further illustration, FIG. 2 schematically shows a mobile computing device adapted for object location and tracking within a bounded space. The system includes a host server 210 that includes memory and at least one processor and is physically coupled to different wireless access points 240 over physical computer communications network 230. Each of the wireless access points 240 provides for a wireless computer communications network 290 which wireless computer communications network 290 may exist in physical proximity to selected others of the wireless computer communications networks 290 and in some instances, may overlap in full or in part selected others of the wireless computer communications networks 290.

Different mobile computing devices 250 are present within one or more of the wireless computer communications networks 290. Each of the mobile computing devices 250 includes a short-range wireless radio frequency receiver 260 such as a BLUETOOTH™ receiver. Bluetooth is a registered certification mark of BLUETOOTH SIG, INC. of Kirkland, Wash., United States of America. Each of the mobile computing devices 250 also includes an object tracking module 300A that includes computer program instructions that when executing in memory of a respective one of the mobile computing devices 250, is operable to receive a short-range wireless radio frequency signal from a short range wireless radio frequency transmitter 270 of an associated object 280 such as a wearable bracelet or pendant, positioned within close proximity of the short range wireless radio frequency receiver 260.

In this regard, the program instructions are further enabled to extract from the received signal, an object identifier of the associated object 280. The program instructions yet further are operable to identify a particular one of the wireless access points 240 to which the corresponding one of the mobile computing devices 250 is contemporaneously coupled. Finally, the program instructions are operable to generate a message encapsulating both the extracted object identifier and the also the identified particular one of the wireless access points 240, and to transmit the message to the host server 210 through the particular one of the wireless access points 240 and over the physical computer communications network 230.

To that end, a location management module 300B executes in the memory of the host server 210. The location management module 300B also includes computer program instructions operating in concert with those of the object tracking modules 300A to receive different messages from different ones of the mobile computing devices 250 and to extract therefrom the encapsulated object identifiers and identities of the different wireless access points 240 and also a corresponding time stamp for each of the messages. The program instructions of the location management module 300B further are enabled to correlate each of the objects with a different individual within the bounded space as recorded in registry 220. The program instructions of the location management module 300B yet further are enabled to correlate a known position of each of the wireless access points 240 with different ones of the objects 280 based upon the received messages so as to locate the objects 280 within a bounded space at a given time.

Optionally, the program instructions are further enabled to infer a past path of movement of each of the objects 280 based upon a multiplicity of messages received over time in connection with each of the objects 280 in association with different ones of the wireless access points 240 at different known times. As well, based upon a past sequence of locations determined by the program instructions at different times, the program instructions extrapolate a future path of movement of each of the objects 280 within the bounded space including a direction of future movement and a speed of movement. Finally, the program instructions of the location management module 300B are able to identify one or more others of the mobile computing devices 250 within physical proximity to a located one of the objects 280 so as to transmit a text message or other electronic message to those of the mobile computing devices 250 in physical proximity to one of the objects 280 for the benefit of an individual associated with the one of the objects 280.

Figure 3:
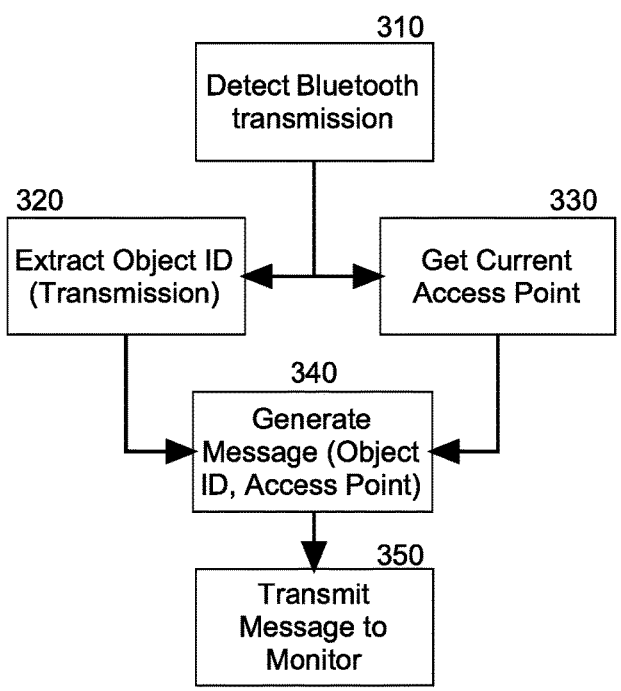

In even yet further illustration of the operation of the object tracking module 300B, FIG. 3 is a flow chart illustrating a process for object location and tracking within a bounded space. Beginning in block 310, a short-range wireless frequency signal transmission is received in the mobile computing device. In response, in block 320 an object identifier is extracted from the signal. As well, in block 330 an identity of an access point to which the mobile computing device is contemporaneously connected is retrieved. Thereafter, in block 340 a message is generated that encapsulates both the object identifier and the identity of the access point. Finally, in block 350, the message is transmitted through the access point to the host server for location processing of an object associated with the object identifier and a corresponding person correlated to the object within the bounded space.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for object location and tracking within a bounded space, the method comprising:
    establishing a wireless communications link between a wireless network adapter disposed within a smartphone and a wireless access point positioned remotely from the smartphone, and receiving thereafter, an identity of the wireless access point;
    receiving a short-range wireless signal in the smartphone by a short-range wireless receiver disposed within the smartphone separately from the wireless network adapter, and extracting from the signal, an identifier of an object;
    generating a message combining the identity of the wireless access point and the identifier of the object; and,
    transmitting the message through the wireless communications link to a host server coupled both to the wireless access point and also several other wireless access points over a computer communications network.

2. The method of claim 1, wherein the short-range wireless receiver is a Bluetooth receiver.

3. The method of claim 1, wherein the object is a wristband comprising non-volatile storage storing the identifier and a Bluetooth transmitter adapted to periodically transmit the identifier.

4. The method of claim 1, wherein the object is a wristband comprising non-volatile storage storing the identifier and a Bluetooth transceiver adapted to receive a Bluetooth signal requesting the identifier from the smartphone, and to respond to the received Bluetooth signal by transmitting a Bluetooth signal with the identifier to the smartphone.

5. A data processing system configured for object location and tracking within a bounded space, the system comprising:
    a host server comprising one or more computers, each with memory and at least one processor, and a network adapter communicatively coupled to a multiplicity of different wireless access points fixed to different locations in a bounded space;
    a multiplicity of objects, each comprising a short-range wireless transmitter and non-volatile memory storing therein a unique identifier;
    a multiplicity of executing instances of an object location and tracking client module, the client module comprising computer program instructions adapted upon execution in memory of a client computing device to receive a short-range wireless signal from one of the objects, to extract from the signal an identifier of the object, to retrieve an identity of one of the wireless access points to which the client computing device is wirelessly coupled, to generate a message combining the identifier of the object with the identity of the one of the wireless access points, and to transmit to the host server by way of the one of the wireless access points; and,
    an instance of an object location and tracking server module, the server module comprising computer program instructions adapted upon execution in the memory of the host server to receive messages from ones of the executing instances of the object location and tracking client module, and for each message, to correlate the received message with one of the objects, to determine an associated one of the wireless access points for the one of the objects, and to write a record in the memory of the server of specifying the one of the objects and a location of the associated one of the wireless access points.

6. The system of claim 5, wherein the computer program instructions of the server module are further adapted to associate a time stamp with each of the received messages and, for each of the objects correlated to the messages, computing a course of movement within the bounded space.

7. The system of claim 5, wherein the computer program instructions of the server module are further adapted to query a database of individuals with the identifier of the object for each of the message so as to associate each of the objects of the received messages with a specific individual.

8. The system of claim 7, wherein the computer program instructions of the server module are yet further adapted to select a target one of the individuals, to determine a location of the target one of the individuals and also nearby one of the individuals also associated with the location based upon both of the nearby one of the individuals being communicatively coupled to a same one of the wireless access points identified for the target one of the individuals, and to transmit text to the nearby one of the individuals specifying the target one of the individuals.

9. The system of claim 5, wherein the bounded space is a cruise ship.

10. The system of claim 5, wherein the bounded space is a hotel.

11. The system of claim 5, wherein the bounded space is an airport.

12. The system of claim 5, wherein the bounded space is an office building.

13. The system of claim 5, wherein the bounded space is a stadium.

14. A computer program product for object location and tracking within a bounded space, the computer program product including a computer readable storage medium having program instructions embodied therewith, the program instructions executable by a device to cause the device to perform a method including:
 establishing a wireless communications link between a wireless network adapter disposed within a smartphone and a wireless access point positioned remotely from the smartphone, and receiving thereafter, an identity of the wireless access point;
 receiving a short-range wireless signal in the smartphone by a short-range wireless receiver disposed within the smartphone separately from the wireless network adapter, and extracting from the signal, an identifier of an object;
 generating a message combining the identity of the wireless access point and the identifier of the object; and,
 transmitting the message through the wireless communications link to a host server coupled both to the wireless access point and also several other wireless access points over a computer communications network.

15. The computer program product of claim 14, wherein the short-range wireless receiver is a Bluetooth receiver.

16. The computer program product of claim 14, wherein the object is a wristband comprising non-volatile storage storing the identifier and a Bluetooth transmitter adapted to periodically transmit the identifier.

17. The computer program product of claim 14, wherein the object is a wristband comprising non-volatile storage storing the identifier and a Bluetooth transceiver adapted to receive a Bluetooth signal requesting the identifier from the smartphone, and to respond to the received Bluetooth signal by transmitting a Bluetooth signal with the identifier to the smartphone.

* * * * *